United States Patent
Sekiguchi et al.

(10) Patent No.: US 7,720,949 B2
(45) Date of Patent: May 18, 2010

(54) METHOD AND APPARATUS FOR RELAY CONTROL AND COMPUTER PRODUCT

(75) Inventors: Atsuji Sekiguchi, Kawasaki (JP); Satoshi Tsuchiya, Kawasaki (JP); Masataka Sonoda, Kawasaki (JP); Kazuki Shimojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1158 days.

(21) Appl. No.: 10/899,372

(22) Filed: Jul. 26, 2004

(65) Prior Publication Data
US 2005/0193107 A1 Sep. 1, 2005

(30) Foreign Application Priority Data
Mar. 1, 2004 (JP) .............................. 2004-056082

(51) Int. Cl.
G06F 15/173 (2006.01)
G06F 15/16 (2006.01)

(52) U.S. Cl. .................... 709/223; 709/232; 709/238
(58) Field of Classification Search ................ 709/223, 709/224, 226, 232, 238
See application file for complete search history.

(56) References Cited

U.S. PATENT DOCUMENTS

| | | | | |
|---|---|---|---|---|
| 6,067,576 A * | 5/2000 | Berranger et al. | ............ | 719/321 |
| 6,578,068 B1 * | 6/2003 | Bowman-Amuah | ......... | 709/203 |
| 6,880,156 B1 * | 4/2005 | Landherr et al. | ............ | 718/105 |
| 6,937,580 B2 * | 8/2005 | Heatwole et al. | ............ | 370/322 |
| 7,080,378 B1 * | 7/2006 | Noland et al. | ................ | 718/104 |
| 7,109,985 B2 * | 9/2006 | Spencer et al. | ............... | 345/418 |
| 7,181,524 B1 * | 2/2007 | Lele | ............................ | 709/226 |
| 7,325,047 B2 * | 1/2008 | Brittenham et al. | ......... | 709/220 |
| 7,333,459 B2 * | 2/2008 | Feyerabend et al. | ......... | 370/338 |
| 2002/0172273 A1 * | 11/2002 | Baker et al. | .................. | 375/222 |
| 2003/0055913 A1 * | 3/2003 | Harkin et al. | ................ | 709/218 |
| 2003/0188013 A1 * | 10/2003 | Nishikado et al. | ........... | 709/238 |
| 2004/0199632 A1 * | 10/2004 | Romero et al. | ............... | 709/226 |
| 2005/0183084 A1 * | 8/2005 | Cuomo et al. | ................ | 718/100 |

FOREIGN PATENT DOCUMENTS

| | | |
|---|---|---|
| JP | 7-064892 | 3/1995 |
| JP | A 9-311795 | 12/1997 |
| JP | A 2001-75934 | 3/2001 |
| JP | A 2002-183106 | 6/2002 |
| JP | 2003-283556 | 10/2003 |

OTHER PUBLICATIONS

"US IBM Announced Technique of Automatic Load Distribution Control by Prediction of Load Change," Nikkei Internet Solutions, Nikkei Business Publications. Inc. Mar. 22, 2003, vol. 69, p. 162.

* cited by examiner

*Primary Examiner*—Paul H Kang
*Assistant Examiner*—Kristie D Shingles
(74) *Attorney, Agent, or Firm*—Fujitsu Patent Center

(57) ABSTRACT

A relay control apparatus is arranged between clients and a CoD system. The relay control apparatus accepts process requests from the clients and stores the process requests. If the CoD system is installing a server in addition to existing servers, the relay control apparatus provides a control so that requests unprocessable with the existing servers are not passed to the CoD system until the installation of the server is completed. When the installation of the server is completed, servers that can process, within a predetermined period, a volume of requests at that time and a volume of requests retained by that time are secured.

6 Claims, 8 Drawing Sheets

METHOD AND APPARATUS FOR RELAY CONTROL AND COMPUTER PRODUCT

CROSS-REFERENCE TO RELATED APPLICATIONS

This application is based upon and claims the benefit of priority from the prior Japanese Patent Application No. 2004-056082, filed on Mar. 1, 2004, the entire contents of which are incorporated herein by reference.

BACKGROUND OF THE INVENTION

1) Field of the Invention

The present invention relates to a technology for relaying process requests from clients to a server.

2) Description of the Related Art

In recent years, the Capacity on Demand (CoD) technology has become prevalent in client-server systems on the Internet. In the CoD technology, it is possible to change the number of servers depending on the volume of requests from clients.

The CoD technology was necessary and was put into practical use because of an increase in various services using the Internet as well as an increase in outsourcing businesses for routine tasks. The services using the Internet have a characteristic in that the volume of requests from the clients to the servers fluctuates in a wide range, sometimes of the order of several digits. However, very few service providers prepare or can prepare fixed facilities that are sufficient to cope with large volume of requests. On the other hand, a large-scale outsourcing business provider having an Internet Data Center (IDC) has become a host to a large number of customers providing such services.

In the CoD system, a server is provided to each customer, and servers are rented out from a shared server pool as required. That is, as shown in FIG. 8, when demands for a service from client 800 of an n-th customer is high, a CoD system managing apparatus 802a in a CoD system 802 allocates a required server in the shared server pool to the customer via a relay network 801. When the demands become low, the server that was allocated is deallocated. This can achieve stable service supply with the effective use of facilities and reduction in fixed cost.

Time is required to install an operating system (OS) and applications in a new server. If a large number of service requests arrive while a new server is being installed, overload is put on the system. This increases response time and reduces service level. Moreover, some requests are discarded, which leads to loss of business opportunities. Also, some of the discarded requests are retransmitted, thereby increasing loads. In CoD, the number of servers tends to be suppressed in normal times. Therefore, the CoD system is vulnerable to a sudden increase in volume of requests. Such a phenomenon tends to occur in the CoD system compared with the conventional case of operations of fixed facilities.

To get around the problems, in a conventional technology disclosed in Japanese Patent Laid-Open Publication No. 7-64892 (hereinafter, a first patent document), for example, requests are distributed according to loads on servers. This prevents overload due to unbalanced use of the servers and, furthermore, deterioration in response time for accepted requests. In another conventional technology disclosed in Japanese Patent Laid-Open Publication No. 2003-283556 (hereinafter, a second patent document), requests are selected depending on the priority, thereby preventing overload on the servers and deterioration in response time for the selected requests.

In the conventional general Hyper Text Transfer Protocol (HTTP: RFC1945, 2616) proxy, a request from a client is terminated at a Transmission Control Protocol (TCP) level. Therefore, at least discarding of a request due to a timeout at the TCP level can be prevented. In another conventional scheme, an arrangement is made for speedily installing an additional server. In still another conventional scheme, the number of servers required is estimated, and then the estimated number of servers is installed in advance so as to at least seemingly reduce an installation time.

However, in the conventional technology disclosed in the first patent document, no consideration is given to the case of queuing, in which unprocessable requests are retained for a long time due to a large number of demands from clients or a long server installation time. Therefore, some requests are inevitably discarded due to the occurrence of a timeout at an application level, as in the case of an HTTP service. This timeout time depends on the application or the user. For example, a request for viewing a WWW page is cancelled if the request cannot be processed within approximately eight seconds, and this is known as the "eight-second rule" (in this case, the timeout time is eight seconds). If the additional installing process takes only six seconds but processing requests retained during those six seconds further takes two or more seconds, the requests are also cancelled.

On the other hand, in the conventional technology disclosed in the second patent document, requests are not retained to begin with, but are selected or discarded. Therefore, only the selected requests are processed, and the rest are discarded. Also, the conventional HTTP proxy does not consider a timeout at an application level. Therefore, as with the conventional technology disclosed in the first patent document, when requests are retained for a long time, the occurrence of discard is inevitable. Even if the time required for the additional server installing process becomes shorter, fluctuations in the volume of requests during installation cannot be coped with. Moreover, even if the number of servers required is estimated and the required servers are installed in advance, an unexpected sudden increase in the volume of requests cannot be handled, to begin with. Therefore, in either case, discard will occur.

Discarding of requests can occur even if the conventional technologies are combined. At any rate, the occurrence of discard due to the occurrence of a timeout at an application level, which is not considered in the conventional technologies, is inevitable. As such, in the conventional CoD technology, discard of requests and deterioration in response time are inevitable when a sudden increase in the volume of requests occurs.

SUMMARY OF THE INVENTION

It is an object of the present invention to at least solve the problems in the conventional technology.

A relay control method according to an aspect of the present invention is a method for relaying a process request to an information processing system that dynamically installs an additional server in addition to an existing server according to a volume of process requests from a client. The relay control method includes determining whether the information processing system is installing the additional server; relaying the process request received from the client to the information processing system when it is determined at the determining that the information processing system is not installing the additional server; and relaying only a process request processable by the existing server from among process requests received from the client to the information processing system when it is determined at the determining that the information processing system is installing the additional server.

A relay control device according to another aspect of the present invention relays a process request to an information processing system that dynamically installs an additional server in addition to an existing server according to a volume of process requests from a client. The relay control device includes a determining unit that determines whether the information processing system is installing the additional server; a first relaying unit that relays the process request received from the client to the information processing system when it is determined by the determining unit that the information processing system is not installing the additional server; and a second relaying unit that relays only a process request processable by the existing server from among process requests received from the client to the information processing system when it is determined by the determining unit that the information processing system is installing the additional server.

A computer program according to still another aspect of the present invention realizes the above relay control method on a computer.

A computer-readable recording medium according to still another aspect of the present invention stores therein the above computer program.

The other objects, features, and advantages of the present invention are specifically set forth in or will become apparent from the following detailed description of the invention when read in conjunction with the accompanying drawings.

DETAILED DESCRIPTION

Exemplary embodiments of a method and an apparatus for relay control, and computer product according to the present invention are described below in detail while referring to accompanying drawings.

Figure 1:
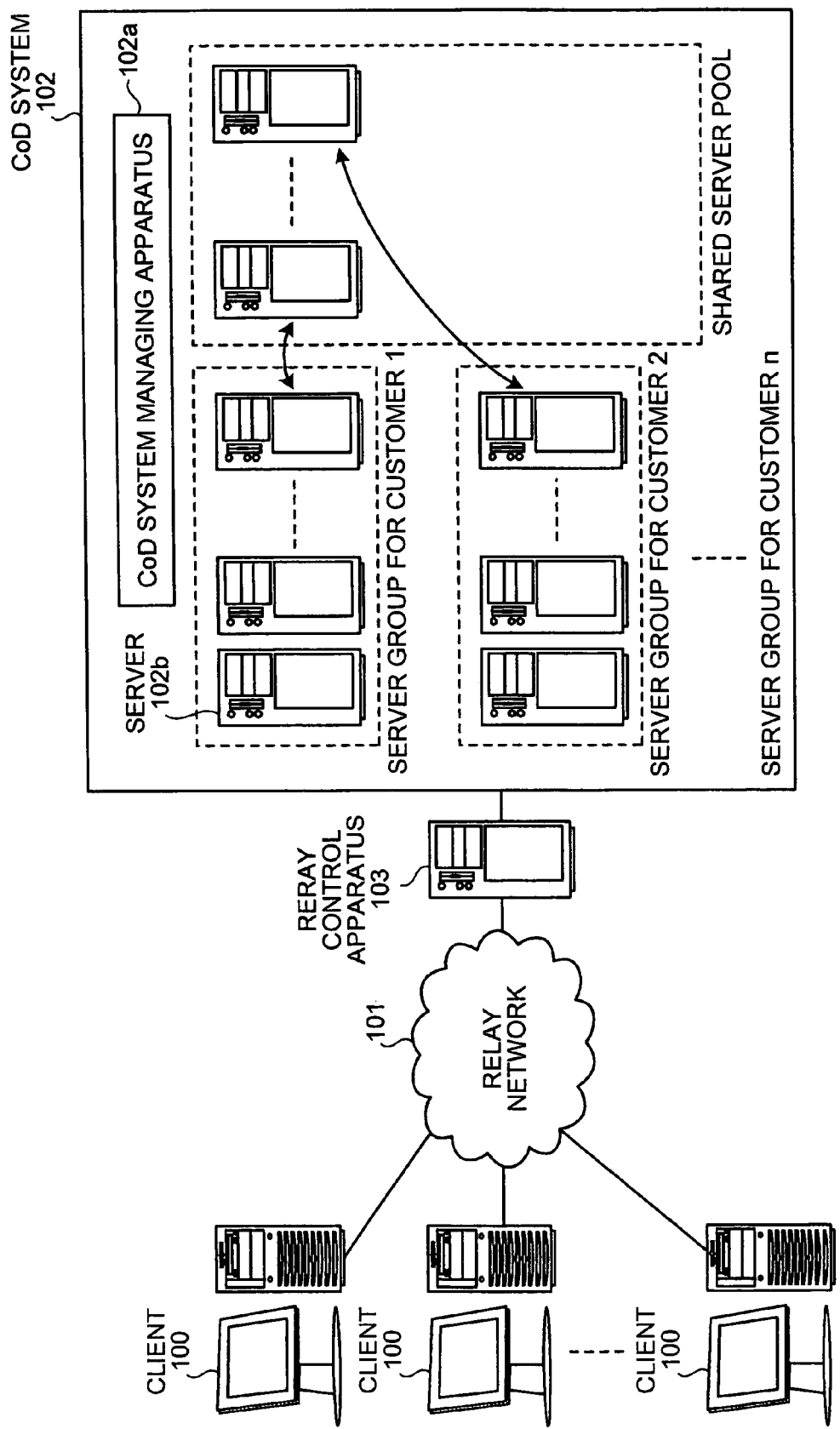
FIG. 1 is a schematic of a client-server system including a relay control apparatus according to an embodiment of the present invention.

FIG. 1 is a schematic of a client-server system including a relay control apparatus according to an embodiment of the present invention. This client-server system includes a plurality of clients 100, a relay control apparatus 103, and a CoD system 102. Each of the client 100 are connected with servers 102b in the CoD system 102 via a relay network 101 and the relay control apparatus 103. The relay network 101 is for example the Internet. It is assumed that the servers 102b are WWW servers that return an HTTP response to an HTTP request from any of the clients 100.

As will be described in detail further below, a CoD system managing apparatus 102a instructs (a number calculating unit 304 of) the relay control apparatus 103 to calculate the number of servers required for each customer and, when the required number exceeds the current number of servers (that is, when additional installation is required), adds a required number of servers 102a included in a shared server pool to a server group for customers. Specifically, this additional installing process involves, for example, installation of an OS and applications, such as a service program, to the additional server 102b; various settings such as an IP address; addition of a server whose load is to be distributed to a load balancer; and network device setting such as VLAN setting.

Of requests received from the clients 100, the relay control apparatus 103 positively causes requests that cannot be processed with the current number of servers to be retained therein (does not relay them to the CoD system 102 side), thereby preventing overload on the servers 102b. In general, with overload, the processing power of the server 102b is sharply deteriorated. Therefore, until additional server installation by the CoD system managing apparatus 102a is completed, requests more than those processable with the current number of servers are purposely caused to be retained in the relay control apparatus 103. This prevents problems, such as an increase in response time, discard of requests, and instability of the system due to overload.

Figure 2:
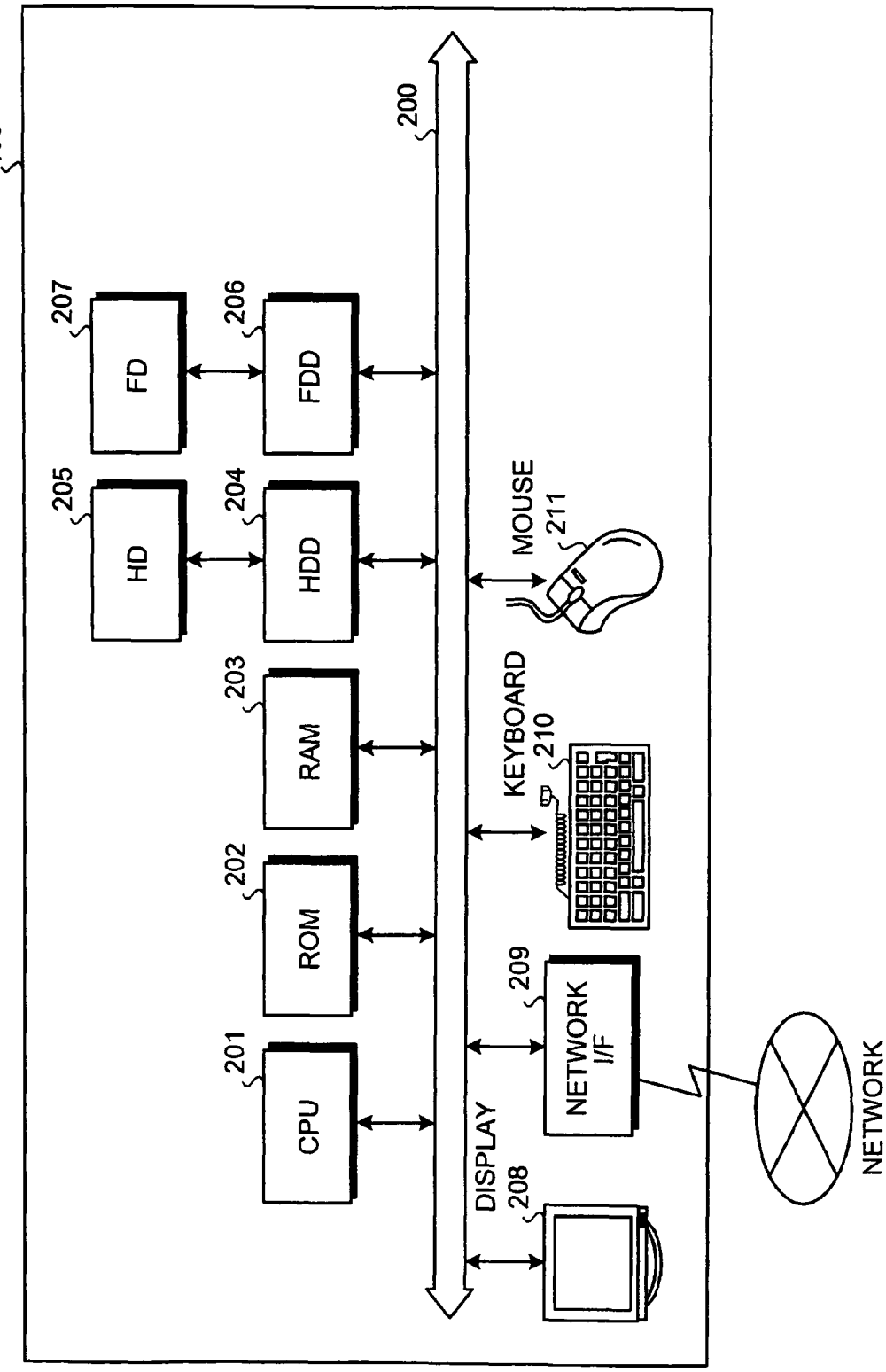
FIG. 2 is a block diagram of a hardware structure of a relay control apparatus shown in FIG. 1.

FIG. 2 is a block diagram of a hardware structure of a relay control apparatus 103. In this relay control apparatus 103, a CPU 201 controls over the entire apparatus. ROM 202 stores a boot program and the like. RAM 203 is used as a working area of the CPU 201.

An HDD 204 controls read/write of data from/to an HD 205 under the control of the CPU 201. The HD 205 stores data written under the control of the HDD 204. An FDD 206 controls read/write of data from/to an FD 207 under the control of the CPU 201. The FD 207 stores data written under the control of the FDD 206. The FD 207 is merely an example of a removable storage medium, and may be replaced by a CD-ROM (CD-R, CD-RW), MO, Digital Versatile Disk (DVD), memory card, or the like.

A display 208 displays various data, such as documents and images, including a cursor, windows and icons. A network I/F 209 is connected to a network, such as a LAN/WAN, for transmission and reception of data between the network and the inside of the apparatus. A keyboard 210 includes a plurality of keys for inputting characters, numerals, and various instructions so as to input data corresponding to a pressed key to the inside of the apparatus. A mouse 211 inputs, to the inside of the apparatus, the amount and direction of rotation of a ball provided at its bottom and an ON/OFF state of each button provided at its top when occasion arises. A bus 200 connects the components to one another.

Figure 3:
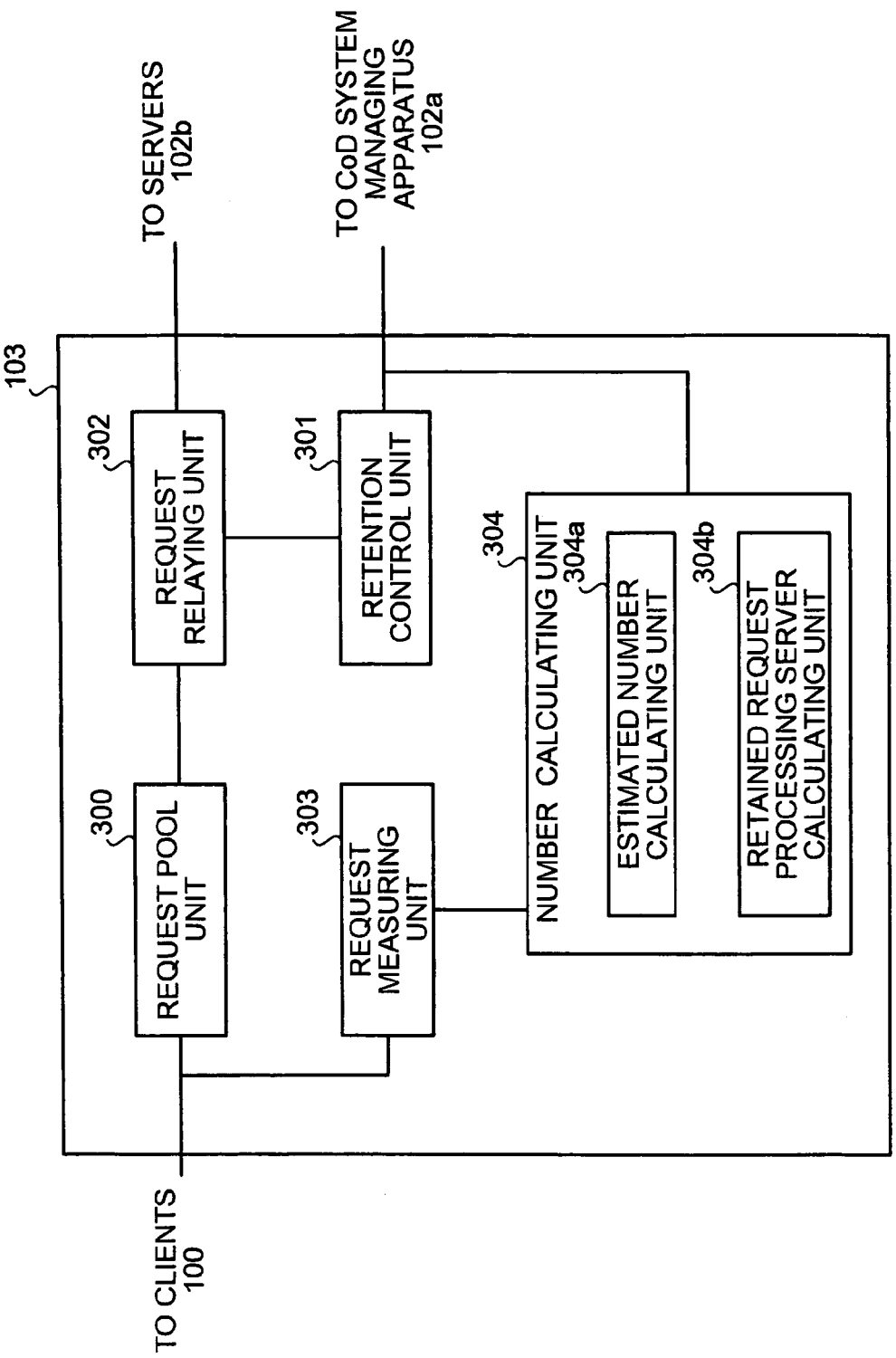
FIG. 3 is a functional block diagram of the relay control apparatus shown in FIG. 1.

FIG. 3 is a functional block diagram of the relay control apparatus 103. The relay control apparatus 103 includes a request pool unit 300, a retention control unit 301, a request relaying unit 302, a request measuring unit 303, and a number calculating unit 304. The number calculating unit 304 further includes an estimated number calculating unit 304a and a retained request processing server calculating unit 304b.

The request pool unit 300 is a functional unit that receives a request to any of the servers 102b from any of the clients 100 via the relay network 101 and also temporarily pools the received request.

Figure 4:
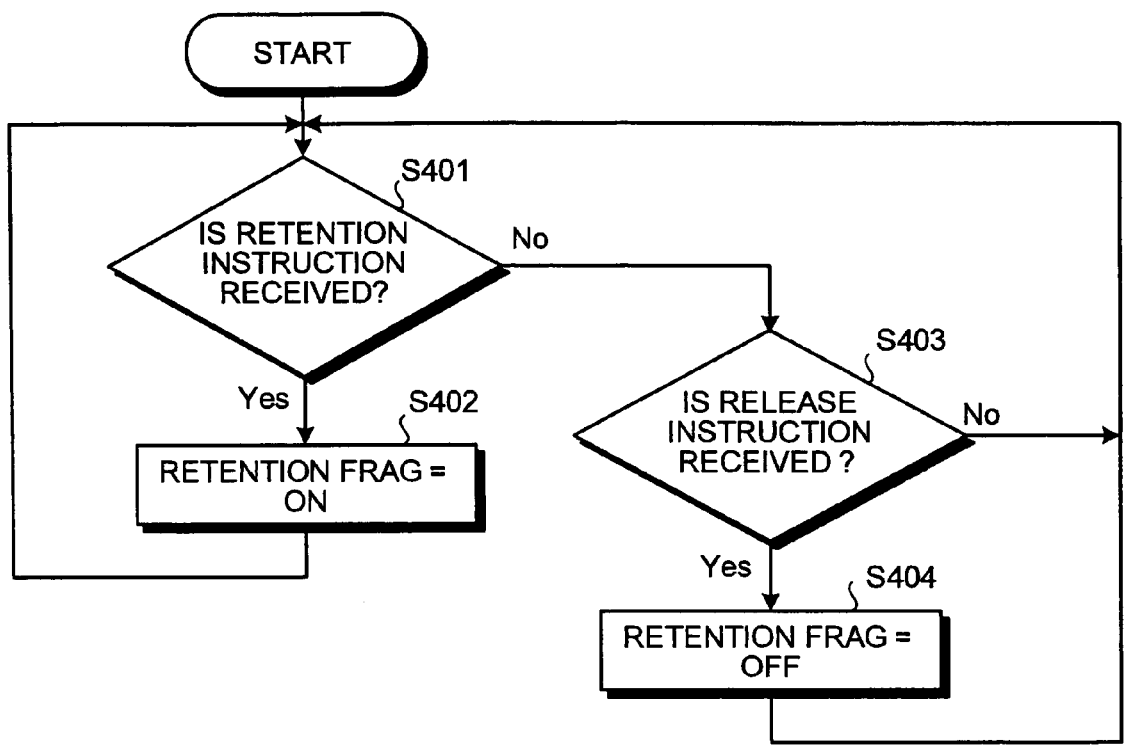
FIG. 4 is a flowchart of a retention flag ON/OFF switching process performed by a retention control unit shown in FIG. 3.

The retention control unit 301 is a functional unit that holds a "retention flag" and switches ON/OFF of the flag according to an instruction from the CoD system 102. The CoD system managing apparatus 102a transmits a retention instruction at the time of starting an additional server installing process and a release instruction at the time of ending the additional server installing process. Thus, as shown in FIG. 4, the retention control unit 301 sets the retention flag ON when receiving a retention instruction (step S401: Yes, step S402), and sets the retention flag OFF when receiving a release instruction (step S401: No, step S403: Yes, step S404). Therefore, the retention flag is set ON only while the CoD system 102 is performing an additional server installing process. When an instruction that is neither a retention instruction nor a release instruction is received, the retention control unit 301 does nothing (step S401: No, step S403: No).

Returning to description of FIG. 3, the request relaying unit 302 is a functional unit that relays (transfers) a request (if any) stored in the request pool unit 300 and processable with the current number of servers to the CoD system 102.

Figure 5:
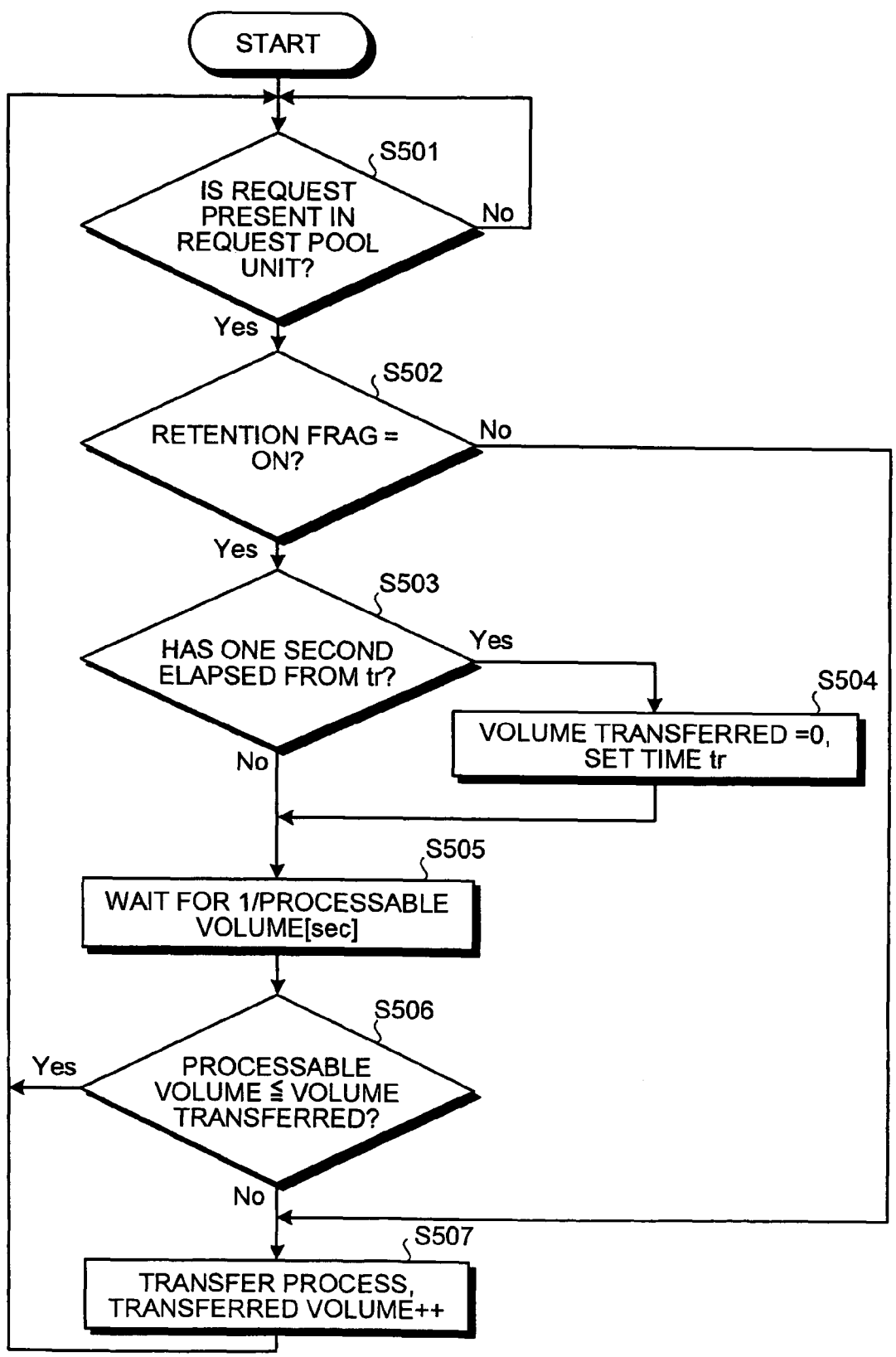
FIG. 5 is a flowchart of a process request relaying process performed by a request relaying unit shown in FIG. 3.

That is, as shown in FIG. 5, when requests are stored in the request poll unit 300 (step S501: Yes), the request relaying unit 302 extracts one of these requests to check whether the retention flag in the retention control unit 301 is ON or OFF. Then, if the retention flag=OFF (step S502: No), the request is simply transferred to the CoD system 102 side (step S507). At this time, a counter that monitors the volume of transferred requests is incremented by the volume of requests actually transferred.

On the other hand, if the retention flag=ON (step S502: Yes), that is, if the CoD system 102 is performing an additional server installing process, only the requests processable with the current number of servers are transferred, and the remaining requests are retained in the request pool unit 300.

To achieve this, the previous clear time of the counter is held as tr and, every time a predetermined time (here, one second) elapses from tr, the counter is cleared and tr is newly set (updated) (step S503: Yes, step S504). Then, the request extracted from the request pool unit 300 is transferred to the CoD system 102 side on condition that a volume of transferred requests indicated by the counter does not exceed a volume of processable requests after a wait for (1/processable volume) second (step S505, step S506: No, step S507). On the other hand, when the volume of transferred requests reaches the processable volume (step S506: Yes), the procedure does nothing but returns to step S501.

After this additional installing process is completed, the retention flag is set OFF. Thus, the processable volume is increased, and the retained volume in the request pool unit 300 is gradually decreased.

Returning to description of FIG. 3, the request measuring unit 303 is a functional unit that measures the frequency of requests to the servers 102b (the volume of requests per unit time) received by the present apparatus from any of the clients 100 via the relay network 101. The frequency measured here is used by the number calculating unit 304 for calculating the number of servers, which will be described below.

The number calculating unit 304 is a functional unit that calculates the number of servers required for processing requests from the clients 100 within a predetermined period of time in response to an instruction from the CoD system 102.

Figure 6:
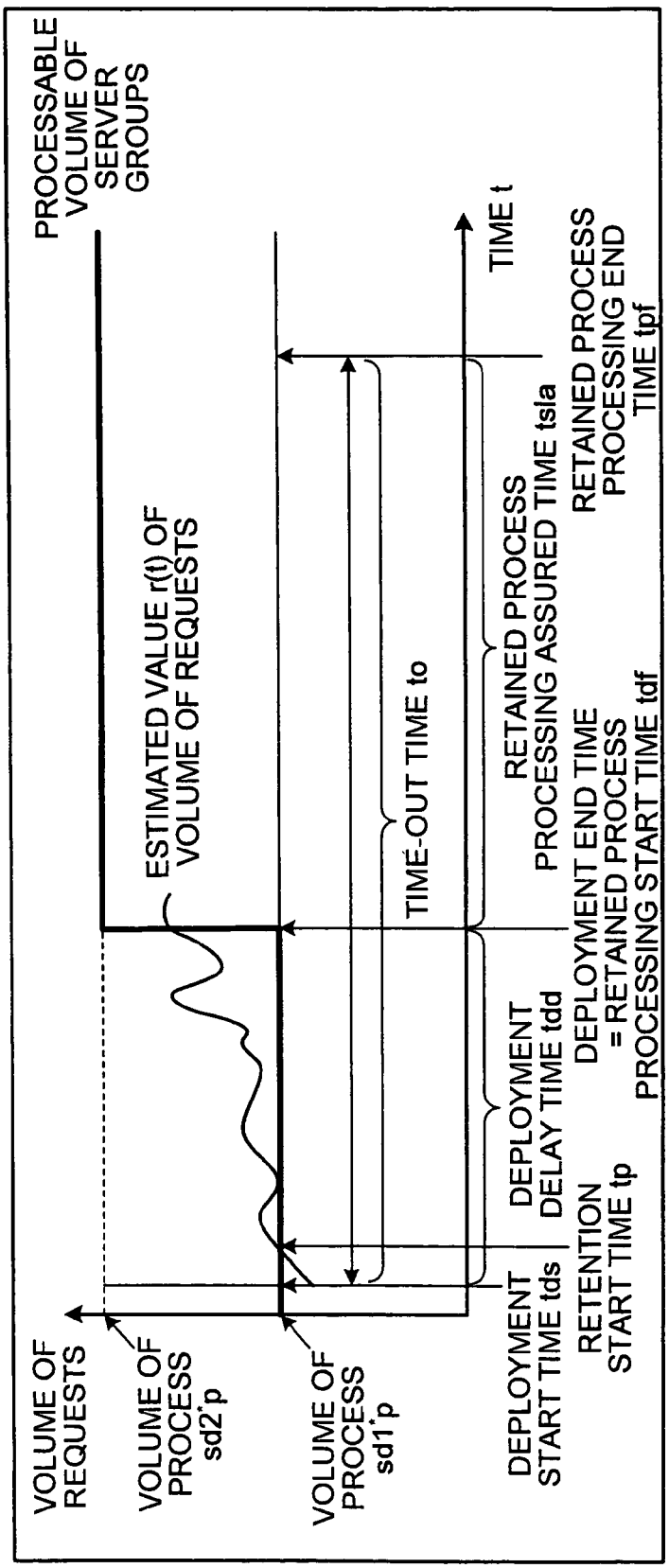
FIG. 6 is a schematic for explaining meanings of each parameter used by a number calculating unit shown in FIG. 3.

FIG. 6 is a schematic for explaining meanings of each parameter used by the number calculating unit 304 when calculating the number of servers. In the drawing, an application timeout time to, a deployment start time tds, a retention start time tp, a deployment end time tdf, a number sd1 of servers at the start of deployment, and a volume p of processes performed by the servers are known (hereinafter, for convenience of description, it is assumed that tds=tp). Also, a deployment delay time tdd, a retained request processing assured time tsla, and a retained request processing end time tpf can be obtained simply through calculation from the above known values. That is, tdd=tdf−tp, tsla=to−tdd, and tpf=tdf+tsla.

At the deployment start time tds, the number calculating unit 304 calculates a number sd2 of servers at the end of deployment (the number of servers at the deployment end time tdf). To do this, the volume of requests at the deployment end time tdf has to be estimated (how many servers are required cannot be known unless the volume of requests at the time of completion of additional installation is known). Therefore, in the present embodiment, a volume r(t) of requests at an arbitrary time t after the start of deployment is found through linear approximation as r(t)=at+b. Here, regression coefficients a and b at the deployment start time tds are calculated from the previous frequency of requests measured by the request measuring unit 303 through a least squares method.

Thus, requests more than currently processable are retained until the CoD system 102 completes deployment of an additional server 102b. Therefore, the number of servers required at the deployment end time tdf is obtained by adding a number A of servers required for processing the requests at the deployment end time tdf within a system's target response time tslo and a number B of servers required for processing the retained requests by the deployment end time tdf within the retained request processing assured time tsla (that is, sd2=A+B). In the number calculating unit 304, the estimated number calculating unit 304a is a functional unit that calculates the number A, while the retained process processing server calculating unit 304b is a functional unit that calculates the number B.

First, a scheme of calculating the number A of servers by the estimated number calculating unit 304a is described. It is assumed that a system includes a queue M/M/c (the requests arrive in a Poisson arrival pattern, service times are in an exponential distribution pattern, and the number of servers is c). With an arrival rate $\lambda$, a service time ts, and a use rate $\rho=\lambda \cdot ts$, an average system retention time E[W] is calculated by the following equations of a model of the queue M/M/c.

$$E[W]=p0*(t1+t2)/\lambda$$

where $$p0 = 1.0 \bigg/ \left[\sum_{k=0}^{c-1} (\rho^k/k!) + (\rho^c/\{(c-1)!(c-\rho)\})\right]$$

$$t1 = \sum_{k=1}^{c-1} (\rho^k/(k-1)!)$$

$$t2 = \rho^c/(c-1)!/(c-\rho)^2 * \{c^2 - (c-1)*\rho\}$$

Then, the number A of servers to achieve the target response time tslo (the target response time is arbitrary as long as it does not exceed the application timeout time to) is represented by a minimum integer c that satisfies E[W]≦tslo, where the volume r(t) of requests is substituted into $\lambda$ of the above equation.

Next, a scheme of calculating the number B of servers by the retained request processing server calculating unit 304b is described. Volume Q(t) of requests stored in the request pool unit 300 during additional server installation is equal to a value obtained by subtracting the number of requests processed by the previous number sd1 of servers ((tdf−tp)·p·sd1)

from a total number of requests arriving during additional installation ($\int r(t')dt'(tp \leq t < tdf)$). Therefore, $$Q(t) = \int r(t')dt' - (tdf - tp) * p * sdl$$
$$= a/2(tdf + tp)(tdf - tp) + (tdf - tp)b - (tdf - tp) * p * sdl$$
$$= (tdf - tp)\{a/2(tdf + tp) + b - p * sdl\}$$
$$= tdd * \{a/2(tdf + tp) + b - p * sdl\}$$

The number B of servers required for processing the requests within the retained request processing assured time tsla (=timeout time to−deployment delay time tdd) is a minimum integer that satisfies:

$$Q(t) \leq B * p * (t0 - tdd)$$
$$B \geq Q(t)/p * (t0 - tdd)$$
$$= \{a/2(tdf + tp) + b - p * sdl\}/(a * p)$$

where α=(t0−tdd)/tdd.

Figure 7:
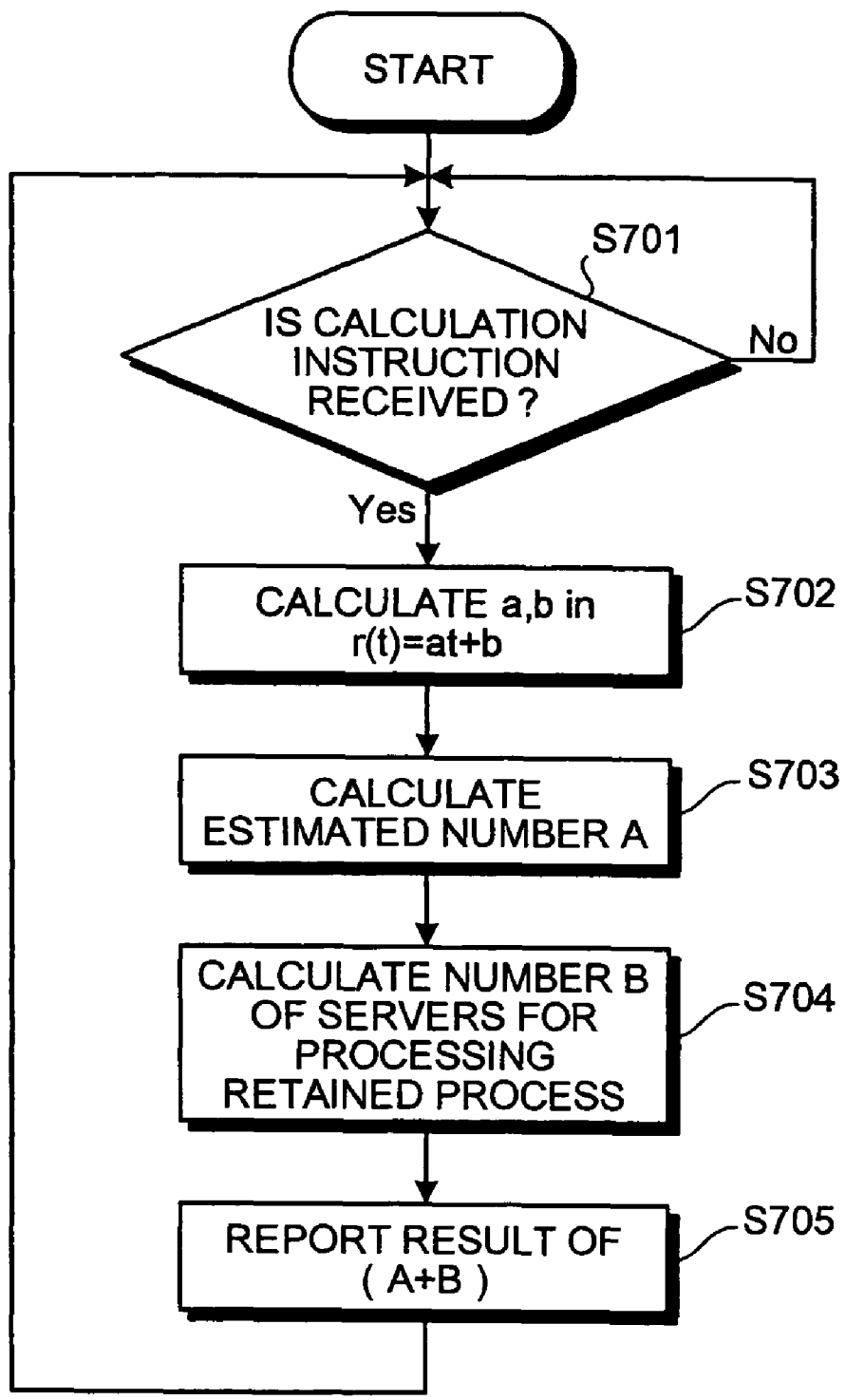
FIG. 7 is a flowchart of a process performed by the request relaying unit when calculating the number of servers.
Figure 8:
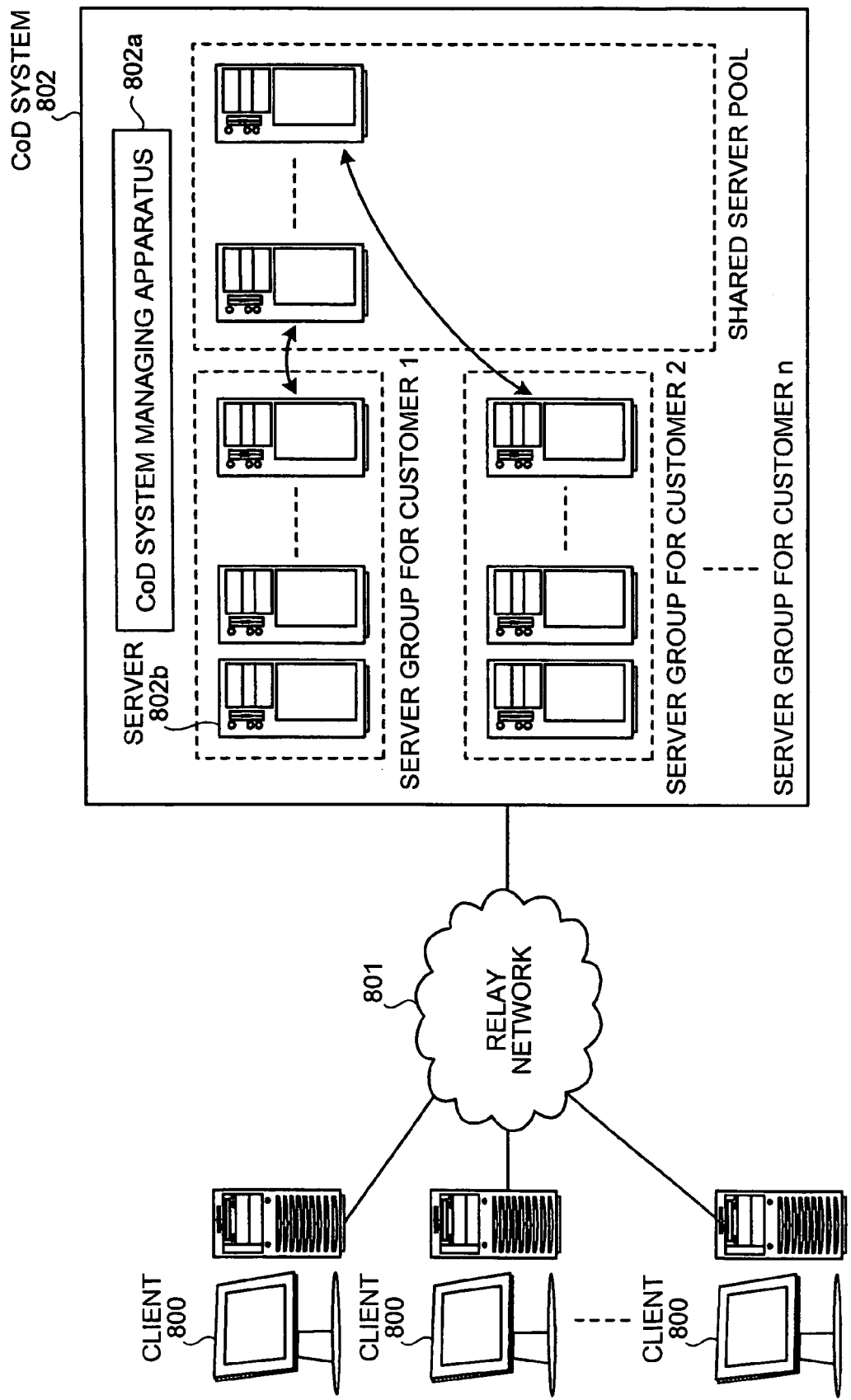
FIG. 8 is a diagram for explaining schematically a CoD system.

FIG. 7 is a flowchart of a process of calculating the number of servers by the number calculating unit 304. On receiving from the CoD system managing apparatus 102a an instruction of calculating the number of servers (step S701:Yes. This instruction is assumed to be made regularly), the number calculating unit 304 calculates the regression coefficients a and b from the previous frequency of requests measured by the request measuring unit 303 to estimate the volume of requests at the deployment end time tdf (step S702).

Next, the estimated number calculating unit 304a of the number calculating unit 304 calculates the number A of servers required for processing the volume r(t) of requests specified by a and b within the target response time tslo (step S703). Also, the retained request processing server calculating unit 304b calculates the number B of servers required for processing the retained requests by the time of completion of the additional server installing process before the timeout (step S704). Then, A+B is reported to the CoD system managing apparatus 102a as the number sd2 of servers at the deployment end time tdf (step S705).

When the volume of requests in future that are estimated from the previous frequency of requests is equal to or less than the volume of processes performed with the current number sd1 of servers (=sd1*p), A calculated at step S703 becomes as A≦sd1. Also, since no request is retained in this case, B calculated at step S704 becomes as B=0. Therefore, sd2 reported at step S705 becomes as sd2≦sd1. Thus, the CoD system managing apparatus 102a does not perform an additional installing process (but may reduce the number of servers).

On the other hand, when the estimated volume of requests exceeds the volume of processes with the current number sd1 of servers, A>sd1 and B>0, and therefore sd2>sd1. Thus, the CoD system managing apparatus 102a starts a process of additionally installing (sd2−sd1) servers 102b. On start of this process, the CoD system managing apparatus 102a issues a retention instruction to the retention control unit 301 of the relay control apparatus 103. On reception of this instruction, the retention control unit 301 causes the retention flag to be ON. Thereafter, relaying of requests to the CoD system 102 is suppressed, and the process continues within the current processing power.

According to the present embodiment, it is possible to prevent overload from occurring on the servers 102b when installation is not in time in the conventional CoD system 102. Furthermore, a decrease in service level, discard of requests, and instability of the system, and the like due to overload can be prevented by positively retaining requests. Still further, to process the requests arriving after the additional installing process within the target response time and also the requests retained during the additional installing process by the application timeout time at the latest, the number of servers to be additionally installed is increased. Therefore, discard of requests can be completely prevented. Also, deterioration in response time can be suppressed. This makes it possible for service providers to avoid a loss of business opportunities and for service users to receive a stable supply of high-quality services.

In the present embodiment, the number calculating unit 304 is provided in the relay control apparatus 103. Alternatively, the number calculating unit 304 may be provided in another apparatus forming the CoD system 102, such as the CoD system managing apparatus 102a. Also, in the present embodiment, the volume of requests in future is calculated through linear approximation using the least squares method. Alternatively, another scheme can be taken. Furthermore, in the present embodiment, the number of servers is calculated with the M/M/c model. Alternatively, another calculation scheme can be taken by using simulation, for example.

Still further, the request relaying unit 302 in the present embodiment merely monitors the volume of requests for output to the CoD system 102 side and does not particularly control the sequence of requests (only sequentially outputs the requests in the order in which they are received from the clients 100). Alternatively, each of the requests may be provided with a priority, and the request may be transferred in the descending order of priority. This makes it possible to prioritize an important request for processing even if retention occurs.

Still further, in the present embodiment, the servers 102b are WWW servers. However, services to be provided are not restricted to services under HTTP, but can be services under File Transfer Protocol (FTP: RFC959), Simple Mail Transfer Protocol (SMTP: RFC821), Post Office Protocol (POP: RFC1939), or Web services. Still further, a request from any of the clients 100 has to pass through the relay control apparatus 103, but a response from any of the servers 102b does not have to pass through the relay control apparatus 103 (prohibiting the response from passing through the relay control apparatus 103 prevents a bottleneck at the relay control apparatus 103).

The relay control method described in the present embodiment can be achieved by a computer program provided in advance being executed by a computer, such as a personal computer or a work station. This program is recorded on a computer-readable recording medium, such as the hard disk 205, the flexible disc 207, CD-ROM, MO, or DVD, and is read from the recording medium by the computer for execution. Also, the program may be a transmission medium that can be distributed over a network, such as the Internet.

According to the relay control method, the relay control program, and the relay control apparatus of the present invention, it is possible to achieve an effect of preventing discard of process requests and deterioration in response time due to an increase in demand from a client.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A relay control method for relaying a process request to an information processing system that dynamically installs an additional server in addition to an existing server according to a volume of process requests from a client, comprising:
   temporarily pooling the process requests in a pooling unit;
   determining whether the information processing system is installing the additional server, wherein an indicator is set to indicate whether the information processing system is installing the additional server;
   relaying the process request received from the client to the information processing system when it is determined at the determining that the information processing system is not installing the additional server and setting the indicator to a first position;
   relaying only a process request processable by the existing server from among process requests received from the client to the information processing system when it is determined at the determining that the information processing system is installing the additional server and setting the indicator to a second position different from the first position;
   estimating the volume of the process requests from the client;
   calculating the number of the additional servers required at a specific time in future from the volume of the process requests estimated at the estimating; and
   reporting the number of the additional servers calculated at the calculating to the information processing system,
   wherein the calculating includes calculating the number of the additional servers as a sum of
      the number of additional servers at the specific time required for processing within a predetermined period process requests received from the client, and
      the number of additional servers required for processing within the predetermined period process requests received from the client and yet not relayed to the information processing system by a specific time.

2. The relay control method according to claim 1, wherein the predetermined time is shorter than a timeout time of an application on the client.

3. A relay control device that relays a process request to an information processing system that dynamically installs an additional server in addition to an existing server according to a volume of process requests from a client, comprising:
   a request pool unit to temporarily pools the process requests;
   a determining unit to determine whether the information processing system is installing the additional server, wherein an indicator is set to indicate whether the information processing system is installing the additional server;
   a first relaying unit to relay the process request received from the client to the information processing system once it is determined by the determining unit that the information processing system is not installing the additional server and to set the indicator to a first position;
   a second relaying unit to relay only a process request processable by the existing server from among process requests received from the client to the information processing system once it is determined by the determining unit that the information processing system is installing the additional server and to set the indicator to a second position different from the first position;
   an estimating unit to estimate the volume of the process requests from the client;
   a calculating unit to calculate the number of the additional servers required at a specific time in future from the volume of the process requests estimated at the estimating; and
   a reporting unit to report the number of the additional servers calculated at the calculating to the information processing system,
   wherein the calculating unit calculates the number of the additional servers as a sum of
      the number of additional servers at the specific time required for processing within a predetermined period process requests received from the client, and
      the number of additional servers required for processing within the predetermined period process requests received from the client and yet not relayed to the information processing system by a specific time.

4. The relay control device according to claim 3, wherein the predetermined time is shorter than a timeout time of an application on the client.

5. A computer-readable recording medium that contains a computer program that includes instructions which when executed on a computer causes the computer to relay a process request to an information processing system that dynamically installs an additional server in addition to an existing server according to a volume of process requests from a client, the computer program causing the computer execute:
   temporarily pooling the process requests;
   determining whether the information processing system is installing the additional server, wherein an indicator is set to indicate whether the information processing system is installing the additional server;
   relaying the process request received from the client to the information processing system when it is determined at the determining that the information processing system is not installing the additional server and setting the indicator to a first position;
   relaying only a process request processable by the existing server from among process requests received from the client to the information processing system when it is determined at the determining that the information processing system is installing the additional server and setting the indicator to a second position different from the first position;
   estimating the volume of the process requests from the client;
   calculating the number of the additional servers required at a specific time in future from the volume of the process requests estimated at the estimating; and
   reporting the number of the additional servers calculated at the calculating to the information processing system,
   wherein the calculating includes calculating the number of the additional servers as a sum of
      the number of additional servers at the specific time required for processing within a predetermined period process requests received from the client, and
      the number of additional servers required for processing within the predetermined period process requests received from the client and yet not relayed to the information processing system by a specific time.

6. The computer-readable recording medium according to claim 5, wherein
   the predetermined time is shorter than a timeout time of an application on the client.

* * * * *